US012027787B2

(12) United States Patent
Gouchi

(10) Patent No.: US 12,027,787 B2
(45) Date of Patent: Jul. 2, 2024

(54) ANTENNA MODULE, COMMUNICATION DEVICE IN WHICH ANTENNA MODULE IS INSTALLED, AND METHOD OF MANUFACTURING ANTENNA MODULE

(71) Applicant: Murata Manufacturing Co., Ltd., Kyoto (JP)

(72) Inventor: Naoki Gouchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 378 days.

(21) Appl. No.: 17/366,619

(22) Filed: Jul. 2, 2021

(65) Prior Publication Data

US 2021/0336342 A1 Oct. 28, 2021

Related U.S. Application Data

(63) Continuation of application No. PCT/JP2019/051185, filed on Dec. 26, 2019.

(30) Foreign Application Priority Data

Jan. 17, 2019 (JP) ................................ 2019-006182

(51) Int. Cl.
*H01Q 9/04* (2006.01)
*H01Q 1/24* (2006.01)
(Continued)

(52) U.S. Cl.
CPC ........... *H01Q 9/0407* (2013.01); *H01Q 1/243* (2013.01); *H01Q 1/38* (2013.01); *H01Q 1/48* (2013.01);
(Continued)

(58) Field of Classification Search
CPC ........ H01Q 9/0407; H01Q 1/48; H01Q 1/243; H01Q 1/38; H01Q 21/065; H01Q 9/0414; H01Q 5/378; H01Q 21/08; H01Q 23/00
See application file for complete search history.

(56) References Cited

U.S. PATENT DOCUMENTS 5,898,405 A * 4/1999 Iwasaki ................ H01Q 9/0457 343/846
2015/0188228 A1* 7/2015 Yosui ..................... H01Q 23/00 343/866
(Continued)

FOREIGN PATENT DOCUMENTS

JP 62123804 A * 6/1987
JP S62-123804 A 6/1987
(Continued)

OTHER PUBLICATIONS

International Search Report for International Patent Application No. PCT/JP2019/051185 dated Feb. 4, 2020.
(Continued)

*Primary Examiner* — Hoang V Nguyen
*Assistant Examiner* — Yonchan J Kim
(74) *Attorney, Agent, or Firm* — Pearne & Gordon LLP

(57) ABSTRACT

An antenna module is to be installed in a communication device. The antenna module includes a dielectric substrate that has a multilayer structure, a ground electrode that is disposed in the dielectric substrate, and a first radiating element that has a flat plate shape. The first radiating element has a first surface (a smooth surface) and a second surface (a rough surface) that has a higher degree of surface roughness than that of the smooth surface. The smooth surface of the first radiating element faces the ground electrode.

10 Claims, 10 Drawing Sheets

(51) Int. Cl.

| | |
|---|---|
| ***H01Q 1/38*** | (2006.01) |
| ***H01Q 1/48*** | (2006.01) |
| ***H01Q 5/378*** | (2015.01) |
| ***H01Q 21/06*** | (2006.01) |
| ***H01Q 21/08*** | (2006.01) |

(52) U.S. Cl.
CPC ........... *H01Q 5/378* (2015.01); *H01Q 9/0414* (2013.01); *H01Q 21/065* (2013.01); *H01Q 21/08* (2013.01)

(56) References Cited

U.S. PATENT DOCUMENTS

| | | | | |
|---|---|---|---|---|
| 2017/0229769 | A1 | 8/2017 | Yokoyama et al. | |
| 2020/0119453 | A1 * | 4/2020 | Takayama .............. | H01Q 1/243 |
| 2020/0145038 | A1 * | 5/2020 | Onaka ....................... | H03F 3/19 |

FOREIGN PATENT DOCUMENTS

| | | | | |
|---|---|---|---|---|
| JP | S63-74813 | U | | 5/1988 |
| JP | 01180102 | A | * | 7/1989 |
| JP | H01-180102 | A | | 7/1989 |
| JP | H03-40601 | A | | 2/1991 |
| JP | H07-307613 | A | | 11/1995 |
| JP | H08-181532 | A | | 7/1996 |
| JP | 2018-082277 | A | | 5/2018 |
| WO | 2016/067969 | A1 | | 5/2016 |
| WO | 2018/230475 | A1 | | 12/2018 |
| WO | 2019/008913 | A1 | | 1/2019 |

OTHER PUBLICATIONS

Written Opinion for International Patent Application No. PCT/JP2019/051185 dated Feb. 4, 2020.

* cited by examiner

| | | FIRST EXAMPLE | SECOND EXAMPLE | THIRD EXAMPLE | COMPARATIVE EXAMPLE |
|---|---|---|---|---|---|
| ANTENNA ARRANGEMENT | |  |  |  |  |
| SMOOTH SURFACE | DRIVEN ELEMENT 121 | LOWER SURFACE | UPPER SURFACE | LOWER SURFACE | UPPER SURFACE |
| | PARASITIC ELEMENT 125 | LOWER SURFACE | LOWER SURFACE | UPPER SURFACE | UPPER SURFACE |
| EFFICIENCY [dB] | 38.5GHz | −0.630 | −0.819 | −0.771 | −0.952 |
| | 28GHz | −0.689 | −0.717 | −0.790 | −0.822 |

413
400
CORE SUBSTRATE
(410)
412

ADHESIVE LAYER
(420)
410
400

430
420
410
400

125
121(442)
441
440
420
130(410,420,441)
400
GND(412)
140(430)
410

ANTENNA MODULE, COMMUNICATION DEVICE IN WHICH ANTENNA MODULE IS INSTALLED, AND METHOD OF MANUFACTURING ANTENNA MODULE

CROSS REFERENCE TO RELATED APPLICATIONS

This is a continuation of International Application No. PCT/JP2019/051185 filed on Dec. 26, 2019 which claims priority from Japanese Patent Application No. 2019-006182 filed on Jan. 17, 2019. The contents of these applications are incorporated herein by reference in their entireties.

BACKGROUND

Technical Field

The present disclosure relates to an antenna module, a communication device in which the antenna module is installed, and a method of manufacturing the antenna module, and more specifically, to the structure of an antenna module that improves radiation efficiency.

International Publication No. 2016/067969 (Patent Document 1) discloses an antenna module that includes a radiating element having a flat plate shape and a ground electrode that face each other.

Patent Document 1: International Publication No. 2016/067969

BRIEF SUMMARY

In some cases, the antenna module disclosed in International Publication No. 2016/067969 (Patent Document 1) is installed in a mobile communication device, such as a cellular phone or smartphone. There is a need for a communication device that has improved communication quality. For this purpose, it is necessary to improve the radiation efficiency of an antenna.

The present disclosure improves the radiation efficiency of an antenna module that includes a patch antenna that has a flat plate shape.

An antenna module according to an aspect of the present disclosure is to be installed in a communication device. The antenna module includes a dielectric substrate, a ground electrode that is disposed in the dielectric substrate, and a first radiating element that has a flat plate shape. The first radiating element has a first surface and a second surface that has a higher degree of surface roughness than that of the first surface. The first surface of the first radiating element faces the ground electrode.

A method of manufacturing an antenna module according to an aspect of the present disclosure is a method of manufacturing an antenna module that includes a first layer that contains a first radiating element and a second layer that contains a ground electrode. The first radiating element and the ground electrode have respective smooth surfaces that have a relatively low degree of surface roughness and respective rough surfaces that have a relatively high degree of surface roughness. The method includes (i) a step of joining the rough surface of the first radiating element and a dielectric layer to each other to form the first layer, (ii) a step of joining the rough surface of the ground electrode and a dielectric layer to each other to form the second layer, and (iii) a step of stacking the first layer on the second layer such that the smooth surface of the first radiating element and the smooth surface of the ground electrode face in the same direction, and the smooth surface of the first radiating element faces the ground electrode.

In an antenna module according to the present disclosure, a smooth surface of at least one radiating element that is included in the antenna module faces a ground electrode. Consequently, a loss due to an electric current that flows through the radiating element is reduced, and the radiation efficiency of the antenna module can be improved.

DETAILED DESCRIPTION

Figure 1:
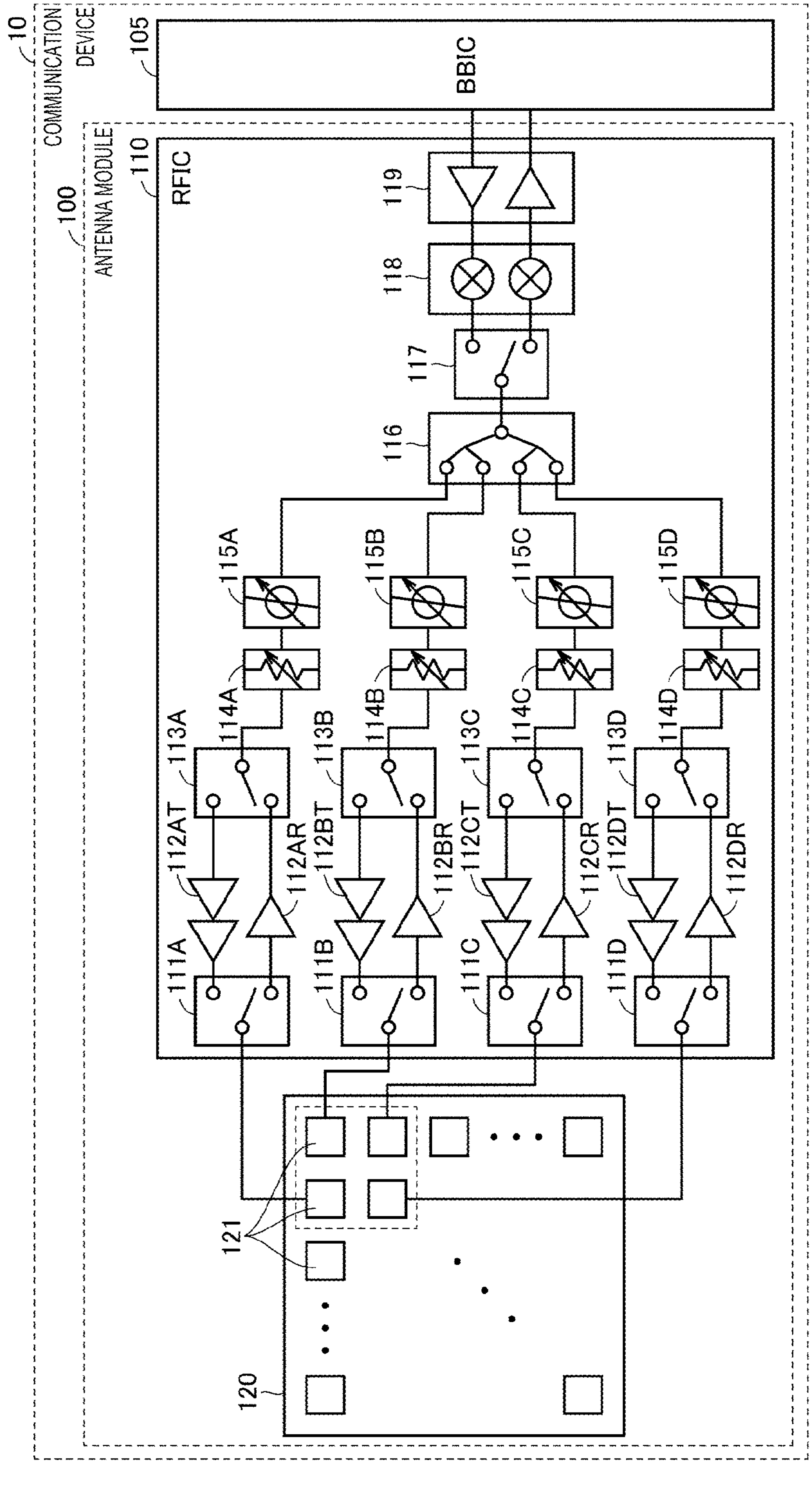
FIG. 1 is a block diagram of a communication device in which an antenna module according to a first embodiment is used.

Embodiments of the present disclosure will hereinafter be described in detail with reference to the drawings. In the drawings, portions like or corresponding to each other are designated by like reference signs, and a description thereof is not repeated.

First Embodiment (Basic Structure of Communication Device)

FIG. 1 is an example of a block diagram of a communication device 10 in which an antenna module 100 according to the present embodiment is used. The communication device 10 is a mobile terminal, such as a cellular phone, a smartphone, or a tablet, or a personal computer that has a communication function. Examples of the frequency band of a radio wave that is used in the antenna module 100 according to the present embodiment include millimeter wave bands the center frequencies of which are, for example, 28 GHz, 39 GHz, and 60 GHz. However, a radio wave in a frequency band out of the bands described above can be used.

Referring to FIG. 1, the communication device 10 includes the antenna module 100 and a BBIC 105 that is included in a base-band-signal-processing circuit. The antenna module 100 includes a RFIC 110 that is an example of a power supply circuit and an antenna device 120. The communication device 10 up-converts a signal that is transmit from the BBIC 105 to the antenna module 100 into a radio frequency signal and radiates the radio frequency signal from the antenna device 120. The communication device 10 down-converts a radio frequency signal that is received by the antenna device 120 and processes the signal by using the BBIC 105.

In FIG. 1, only components associated with four driven elements 121 among driven elements 121 that are included in the antenna device 120 are illustrated, and an illustration of components associated with the other driven elements 121 that have the same structure is omitted to make the description easy to understand. In an example in FIG. 1, the antenna device 120 includes the driven elements 121 that are arranged in a two-dimensional array. However, the number of the driven elements 121 may not be plural, and the antenna device 120 may include a single driven element 121. The driven elements 121 may be aligned in a one-dimensional array. According to the present embodiment, each of the driven elements 121 is a patch antenna that has a substantially square flat shape.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner/demultiplexer 116, a mixer 118, and an amplifier circuit 119.

In the case where the radio frequency signal is transmitted, the switches 111A to 111D, and 113A to 113D are switched to the power amplifiers 112AT to 112DT, and the switch 117 is connected to a transmission amplifier of the amplifier circuit 119. In the case where the radio frequency signal is received, the switches 111A to 111D, and 113A to 113D are switched to the low-noise amplifier 112AR to 112DR, and the switch 117 is connected to a reception amplifier of the amplifier circuit 119.

The signal that is transmitted from the BBIC 105 is amplified by the amplifier circuit 119 and is up-converted by the mixer 118. A transmission signal that is the up-converted radio frequency signal is demultiplexed by the signal combiner/demultiplexer 116 into four signals, which pass through four signal paths and are fed to the different driven elements 121. At this time, the directivity of the antenna device 120 can be adjusted by separately adjusting phase shifts of the phase shifters 115A to 115D that are arranged on the signal paths.

Reception signals that are the radio frequency signals that are received by the driven elements 121 pass through four different reception paths and are multiplexed by the signal combiner/demultiplexer 116. The multiplexed reception signal is down-converted by the mixer 118, amplified by the amplifier circuit 119, and transmitted to the BBIC 105.

An example of the RFIC 110 is an integrated circuit component of a chip that includes the circuit structure described above. Devices (the switches, the power amplifiers, the low-noise amplifiers, the attenuators, and the phase shifters) associated with each driven element 121 of the RFIC 110 may be an integrated circuit component of a chip for the driven element 121 associated therewith.

(Structure of Antenna Module)

Figure 2:
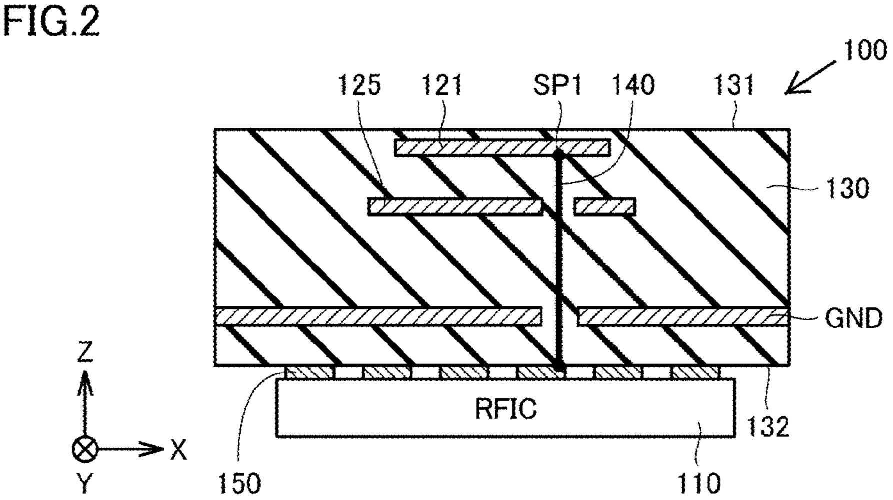
FIG. 2 is a sectional view of an example of the antenna module in FIG. 1.

FIG. 2 is a sectional view of an example of the antenna module 100 in FIG. 1. Referring to FIG. 2, the antenna module 100 includes a parasitic element 125, a dielectric substrate 130, a power-supply wiring line 140, and a ground electrode GND in addition to the driven element 121 and the RFIC 110. In the description below, the positive direction of the Z-axis in the figures is referred to as an upward direction, and the negative direction thereof is referred to as a downward direction in some cases.

Examples of the dielectric substrate 130 include a low temperature co-fired ceramic (LTCC) multilayer substrate, a multilayer resin substrate that has a stack of resin layers composed of, for example, an epoxy resin or a polyimide resin, a multilayer resin substrate that has a stack of resin layers composed of liquid crystal polymer (LCP) that has a decreased dielectric constant, a multilayer resin substrate that has a stack of resin layers composed of a fluorine resin, and a ceramic multilayer substrate other than the LTCC.

A planar shape of the dielectric substrate 130 is rectangular. The driven element 121 that has a substantially square shape is disposed in a layer in the dielectric substrate 130 or on a front surface 131 facing in the upward direction. In the dielectric substrate 130, the ground electrode GND that has a flat plate shape is disposed in a layer away from the driven element 121 in the downward direction. The RFIC 110 is disposed below a back surface 132 of the dielectric substrate 130 facing in the downward direction with a solder bump 150 interposed therebetween.

The parasitic element 125 is disposed in a layer between the driven element 121 and the ground electrode GND and faces the driven element 121. That is, the antenna module 100 is a stack antenna module in which the driven element 121 faces the parasitic element 125. The radio frequency signal is transmitted from the RFIC 110 to the driven element 121. However, no radio frequency signal is transmitted to the parasitic element 125. The driven element 121 and the parasitic element 125 are electrodes that have a substantially square flat plate shape. The size of the parasitic element 125 is larger than that of the driven element 121. In the description below, the driven element and the parasitic element are collectively referred to as "radiating elements" in some cases.

The power-supply wiring line 140 extends through the ground electrode GND and the parasitic element 125 and is connected to a feed point SP1 of the driven element 121. Through the power-supply wiring line 140, the radio frequency signal is transmitted from the RFIC 110 to the driven element 121. The power-supply wiring line 140 is not connected to the parasitic element 125. However, the power-supply wiring line 140 extends through the parasitic element 125. Accordingly, coupling occurs between the power-supply wiring line 140 and the parasitic element 125, and a radio wave is radiated also from the parasitic element 125. As the size of each radiating element increases, the resonant frequency of the radiating element typically decreases, and the frequency of a radio wave that is radiated from the radiating element decreases. For this reason, the frequency of the radio wave that is radiated from the parasitic element 125 is lower than that from the driven element 121. That is, the antenna module 100 is a co-called dual-band antenna module that can radiate radio waves in two frequency bands.

In FIG. 2, the radiating elements (the driven element 121 and the parasitic element 125) are insulated from the ground electrode GND. An end surface in the direction (the Y-axis direction in FIG. 2) perpendicular to the direction of polarization of the radio wave that is radiated from each radiating element may be connected to the ground electrode GND.

In FIG. 2, conductors that are included in the radiating elements, the electrode, and a via for forming the power-supply wiring line, for example, are composed of metal main components of which are aluminum (Al), copper (Cu), gold (Au), silver (Ag), or an alloy thereof.

The antenna module described above functions as an antenna as a result that electromagnetic field coupling occurs between the driven element 121 and the ground electrode GND and between the parasitic element 125 and the ground electrode GND. It is kwon that at this time, an electric current that flows through each radiating element concentrates on the surface facing the ground electrode GND.

As for the electrode that has a flat plate shape and that forms each radiating element, the surface roughness of a first surface relatively decreases, (also referred to below as a "smooth surface"), and the surface roughness of a second surface relatively increases unlike the smooth surface (also referred to below as a "rough surface") during manufacturing processing in some cases. For example, in the case where "electrolytic copper foil" produced by electroplating is used as the electrode for forming the radiating element, a surface that comes into contact with a copper foil cathode drum has a low degree of surface roughness, and a surface on which plating is deposited opposite the copper foil cathode drum has fine irregularities of about several μm.

In each radiating element, the electric current concentrates on the surface (the facing surface) facing the ground electrode as described above. When the facing surface has an increased degree of surface roughness, however, electric resistance increases. Consequently, there is a possibility that the radiation efficiency decreases.

In view of this, as for the radiating elements that are included in the antenna module according to the present embodiment, the smooth surfaces face the ground electrode. This reduces heat generated by the electric current that flows through each radiating element and improves the radiation efficiency.

The surface roughness can be measured, for example, as a root mean square Rq, maximum height roughness Rz, arithmetic mean roughness Ra, or ten-point average roughness Rzjis defined as JISB0601. As for the radiating elements, a surface that has a relatively low degree of surface roughness is referred to as the "smooth surface", and a surface that has a relatively high degree of surface roughness is referred to as the "rough surface" regardless of a measurement method.

Figure 3:
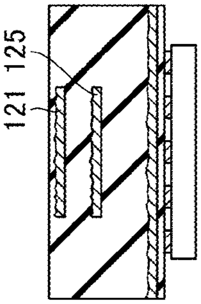
FIG. 3 illustrates differences in radiation efficiency depending on the surface roughness of radiating elements.
Figure 3:
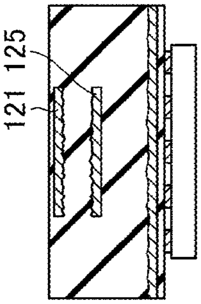
Figure 3:
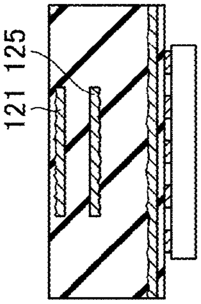
Figure 3:
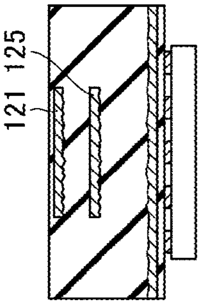

FIG. 3 illustrates differences in the radiation efficiency depending on the surface roughness of each radiating element. The smooth surface of the driven element 121 and the smooth surface of the parasitic element 125 face the ground electrode GND (facing in the downward direction) in a "first example". Of the smooth surfaces, only the smooth surface of the parasitic element 125 faces the ground electrode GND in a "second example". Of the smooth surfaces, only the smooth surface of the driven element 121 faces the ground electrode GND in a "third example". The rough surface of the driven element 121 and the rough surface of the parasitic element 125 face the ground electrode GND in a "comparative example". The driven element 121 or the parasitic element 125 corresponds to a "first radiating element" according to the present disclosure, and the other corresponds to a "second radiating element".

FIG. 3 illustrates results of calculation in simulations of the radiation efficiency in frequency bands when the frequency band of the radio wave that is radiated from the driven element 121 is a band of 38.5 GHz, the frequency band of the radio wave that is radiated from the parasitic element 125 is a band of 28 GHz, and the arrangement of the driven element 121 and the parasitic element 125 differs between the simulations.

The simulations are performed in conditions in which the root mean square Rq is used for the surface roughness of the radiating elements, the surface roughness of each rough surface is 1 μm, and the surface roughness of each smooth surface is 0 μm. In the first to third examples and the comparative example, the surface of the ground electrode GND that faces the radiating elements is the rough surface.

Referring to FIG. 3, in the comparative example, the radiation efficiency of the driven element 121 in the frequency band (38.5 GHz) is −0.952 dB, and the radiation efficiency of the parasitic element 125 in the frequency band (28 GHz) is −0.822 dB.

In the third example in which the smooth surface of the driven element 121 faces the ground electrode GND, however, the radiation efficiency at 38.5 GHz is −0.711 dB and is improved. In the second example in which the smooth surface of the parasitic element 125 faces the ground electrode GND, the radiation efficiency at 28 GHz is −0.717 dB and is improved. In the first example in which the smooth surface of the driven element 121 and the smooth surface of the parasitic element 125 face the ground electrode GND, the radiation efficiency at 38.5 GHz is −0.630 dB and is improved, and the radiation efficiency at 28 GHz is −0.689 dB and is improved.

Also, as for the driven element 121 in the second example and the parasitic element 125 in the third example in which the rough surface faces the ground electrode GND, the radiation efficiency is slightly improved unlike the comparative example. This is presumably achieved due to an improvement in the radiation efficiency of the other radiating element.

As illustrated in FIG. 3, it can be understood that the stack antenna module that supports a dual-band in which the smooth surface of at least one of the radiating elements faces the ground electrode GND enables the radiation efficiency of the antenna to improve.

(Processing of Manufacturing Antenna Module)

An example of processing of manufacturing the antenna module will now be described with reference to FIG. 4A to FIG. 7D.

(First Manufacturing Processing)

FIGS. 4A-4E illustrate a first example of the processing of manufacturing the antenna module according to the first embodiment. The manufacturing processing in FIGS. 4A-4E is used for the case where the smooth surfaces of the conductors, such as the radiating elements and the ground electrode GND face in the same direction as in, for example, the first example in FIG. 3.

Figure 4A:
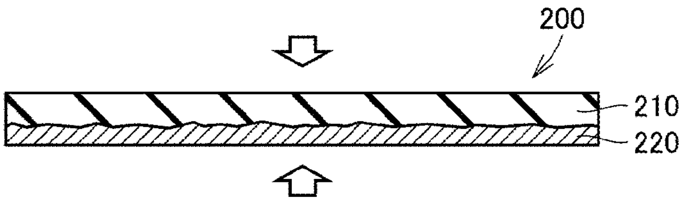
FIGS. 4A-4E illustrate a first example of processing of manufacturing the antenna module.

Referring to FIG. 4A, at a first step, a metal layer 220, such as electrolytic copper foil is joined to a dielectric layer 210 that is used as a substrate to form each of dielectric sheets 200 as a foundation. At this time, the rough surface of the metal layer 220 is joined to the dielectric layer 210. This enables bonding strength between the dielectric layer 210 and the metal layer 220 to be higher than that in the case where the smooth surface of the metal layer 220 is joined to the dielectric layer 210. Accordingly, the metal layer 220 can be prevented from being separated from the dielectric layer 210. The thickness of the dielectric layer 210 of each dielectric sheet 200 may be the same, or sheets that have different thicknesses may be prepared as needed.

Figure 4B:
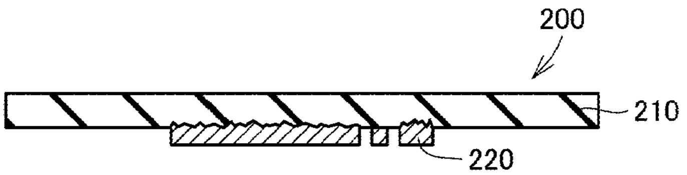

Subsequently, at a second step, the metal layer 220 of one of the dielectric sheets 200 is etched to pattern an electrode that has a desired shape as illustrated in FIG. 4B. Consequently, a radiating element and the electrode for forming the via, for example, are formed. Other wiring patterns, such as the power-supply wiring line are formed at the step although this is not illustrated.

Figure 4C:
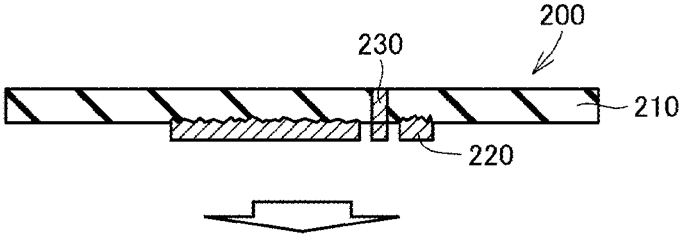

At a third step illustrated in FIG. 4C, a through-hole is formed in a portion of the dielectric layer 210 of the dielectric sheet 200 at which the via is to be formed, and the through-hole is filled with conductive paste 230.

Figure 4D:
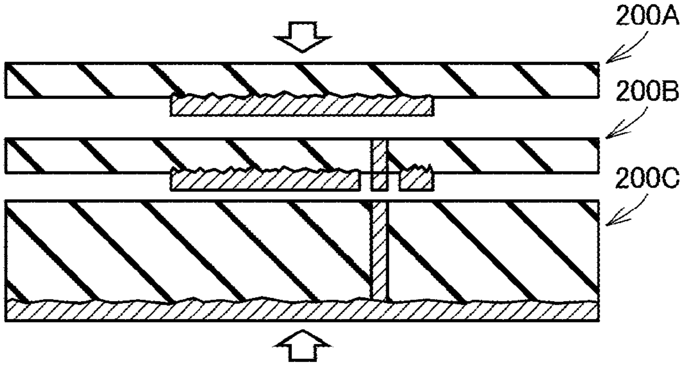

Subsequently at a fourth step illustrated in FIG. 4D, the dielectric sheet that is formed at the step illustrated in FIG. 4C is stacked. In an example illustrated in FIG. 4D, a dielectric sheet 200A on which the electrode of the driven element 121 is formed, a dielectric sheet 200B on which the electrode of the parasitic element 125 is formed, and a dielectric sheet 200C on which the ground electrode GND is formed are stacked. In the stack, the dielectric sheets face in the same direction.

Figure 4E:
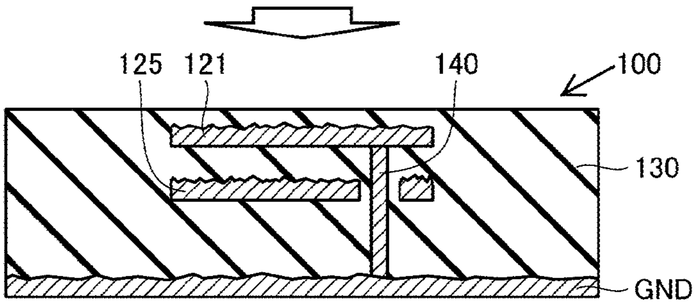

At a fifth step illustrated in FIG. 4E, a hot press process is performed on the stacked dielectric sheets, and the dielectric layers of the dielectric sheets are consequently joined to each other. At this time, the conductive paste 230 is solidified, and the via that connects the electrodes in the layers is consequently formed. In this way, the antenna module 100 illustrated in FIG. 2 is formed.

In the antenna module illustrated in FIG. 4E, no dielectric layer is disposed near the surface of the ground electrode GND facing in the downward direction. However, a dielectric layer can be added near the surface of the ground electrode GND facing in the downward direction by performing the hot press process on a dielectric sheet that is stacked on the lowermost surface on which no metal layer is formed at the step illustrated in FIG. 4D, or by performing a resist process on the ground electrode GND after the step illustrated in FIG. 4D.

The use of the manufacturing processing illustrated in FIGS. 4A-4E enables the antenna module to be formed with the smooth surfaces of the metal layers for forming, for example, the radiating elements and the ground electrode face in the same direction (downward in an example in FIGS. 4A-4E).

(Second Manufacturing Processing)

FIGS. 5A-5E illustrate a second example of the processing of manufacturing the antenna module according to the first embodiment. The manufacturing processing illustrated in FIGS. 5A-5E basically has the same processes as those illustrated in FIGS. 4A-4E but differs in that one of the dielectric sheets is inverted when the dielectric sheets 200 are stacked at the fourth step. In FIGS. 5A-5E, a description of the same steps as those in FIGS. 4A-4E is not repeated.

The manufacturing processing is used when the direction in which the smooth surface of one of the radiating elements faces differs from that of another electrode pattern (the other radiating element and the ground electrode), such as those in the second example and the third example in FIG. 3.

Figure 5A:
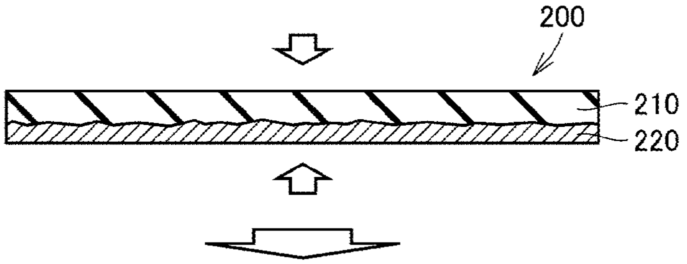
FIGS. 5A-5E illustrate a second example of the processing of manufacturing the antenna module.
Figure 5B:
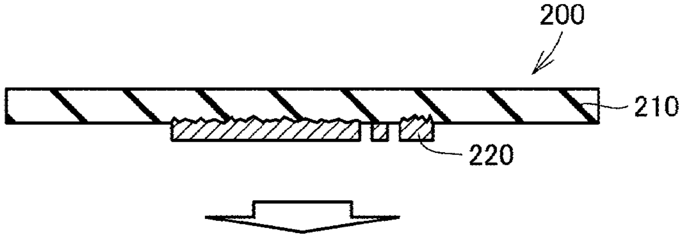
Figure 5C:
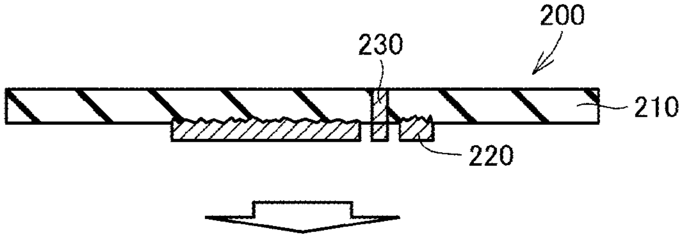

Referring FIGS. 5A-5E, steps illustrated in FIGS. 5A-5C are the same as those illustrated in FIGS. 4A-4C. As for each dielectric sheet 200 that is obtained by joining the dielectric layer 210 and the metal layer 220 to each other, a desired electrode pattern is formed.

Subsequently, the formed dielectric sheets 200 are stacked at the step illustrated in FIG. 5D. At this time, one of the dielectric sheets is inverted and stacked. In an example illustrated in FIG. 5D, a dielectric sheet 200D on which the driven element 121 is to be formed is inverted.

The hot press process on the dielectric sheets that are thus stacked is performed to form the antenna module with the direction in which the smooth surface of one of the radiating elements faces is inverted. In an example in FIGS. 5A-5E, the antenna module is the same as in the second example in FIG. 3 in which the direction of the driven element 121 is inverted. However, the structure in the third example in FIG. 3 can be obtained by inverting the dielectric sheet 200B instead of the dielectric sheet 200D illustrated in FIG. 5D.

Also, in FIGS. 5A-5E, dielectric layers may be additionally disposed on the uppermost surface of the driven element 121 and the lowermost surface of the ground electrode GND.

Figure 5D:
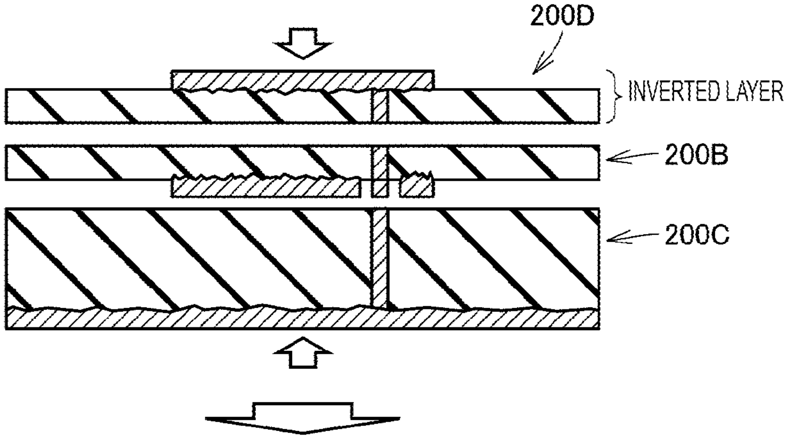
Figure 5E:
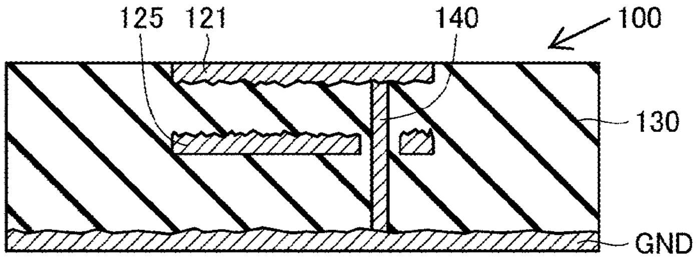

The manufacturing processing illustrated in FIGS. 5A-5E includes an additional step of inverting one of the dielectric sheets in the stacking step illustrated in FIG. 5D. Accordingly, manufacturing costs are slightly higher than those of the steps in FIGS. 4A-4E. However, the radiation efficiency can be further improved in a manner in which the dielectric sheet for forming the ground electrode GND, for example, is inverted such that the surface of the ground electrode GND that faces each radiating element is the smooth surface.

(Third Manufacturing Processing)

FIGS. 6A-6E illustrate a third example of the processing of manufacturing the antenna module according to the first embodiment. The manufacturing processing in FIGS. 6A-6E is an example in which a build-up manufacturing method is used to join an adhesive layer (adhesive) to a core substrate a surface of which is joined to a metal layer or surfaces of which are joined to metal layers, which differs from a method in which the stacked dielectric sheets are hot-pressed as in the examples in FIGS. 4A-4E and FIGS. 5A-5E.

Figure 6A:
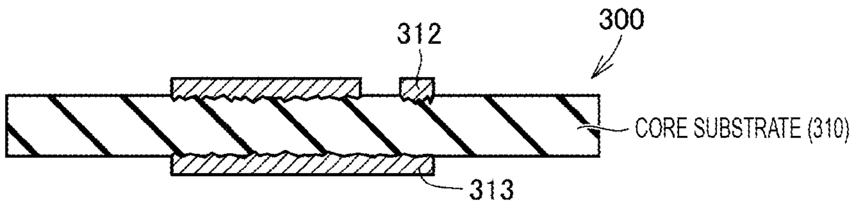
FIGS. 6A-6E illustrate a third example of the processing of manufacturing the antenna module.

Referring to FIG. 6A, metal layers 312 and 313 are joined to respective surfaces of a core substrate 310 at a first step to form a first dielectric layer 300. At the step illustrated in FIG. 6A, the metal layer 312 corresponds to the parasitic element 125 in FIG. 2, and the metal layer 313 corresponds to the driven element 121 in FIG. 2.

The core substrate 310 can be composed of, for example, a LCP, a glass epoxy material (for example, FR4: Flame Retardant Type 4), or polyimide. Electrode patterns that are formed into a desired shape by, for example, punching in advance may be joined as the metal layers, or after the metal layers are entirely joined to the surfaces of the core substrate 310, electrode patterns that have a desired shape may be formed by, for example, etching as illustrated in FIGS. 4A-4E and FIGS. 5A-5E.

At the first step, the metal layers 312 and 313 are joined such that the rough surfaces face the core substrate 310. This enables bonding strength between the core substrate 310 and the metal layers 312 and 313 to be ensured.

Figure 6B:
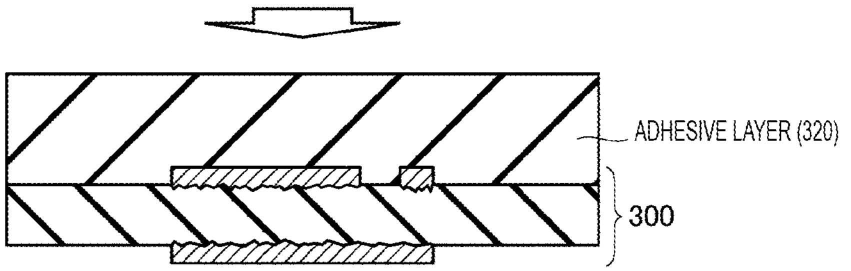

In a second step illustrated in FIG. 6B after the first dielectric layer 300 is formed, an adhesive layer 320 that serves as a second dielectric layer is applied to a surface of the first dielectric layer 300. Examples of the adhesive layer 320 include epoxy resin and fluorine resin.

Figure 6C:
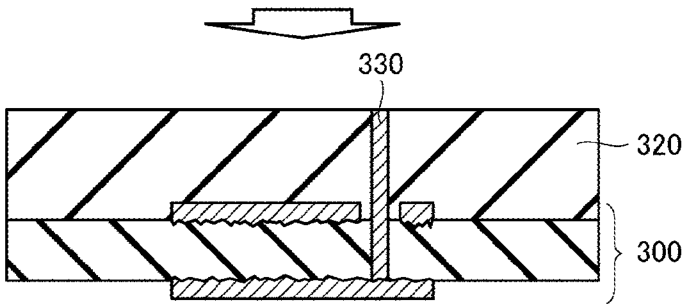

Subsequently, at a third step illustrated in FIG. 6C, through-holes are formed in the core substrate 310 and the adhesive layer 320 by a laser process or a drilling process, and the through-holes are filled with metal conductors to form a via 330.

Figure 6D:
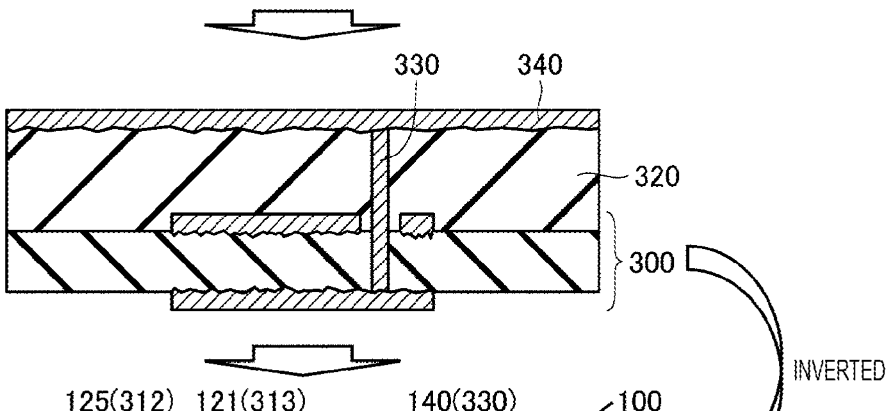
Figure 6E:
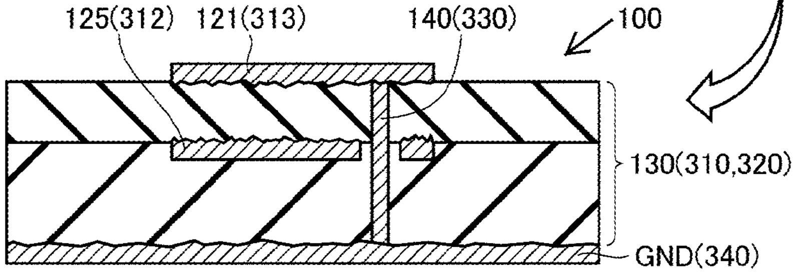

Subsequently, at the step illustrated in FIG. 6D, a metal layer 340 is joined to the adhesive layer 320. This is inverted to form the antenna module in the second example in FIG. 3. At this time, the core substrate 310 and the adhesive layer 320 correspond to the dielectric substrate 130 in FIG. 2. Other dielectric layers may be stacked on the surfaces of the driven element 121 and the ground electrode GND by using adhesive layers.

(Fourth Manufacturing Processing)

FIGS. 7A-7D illustrate a fourth example of the processing of manufacturing the antenna module according to the first embodiment. In the manufacturing processing illustrated in FIGS. 7A-7D, the build-up manufacturing method that is basically the same as that in FIGS. 6A-6E is used. However, in an example in FIGS. 7A-7D, two different core substrates are joined by using an adhesive layer.

Figures 7A, 7B, 7C, 7D:
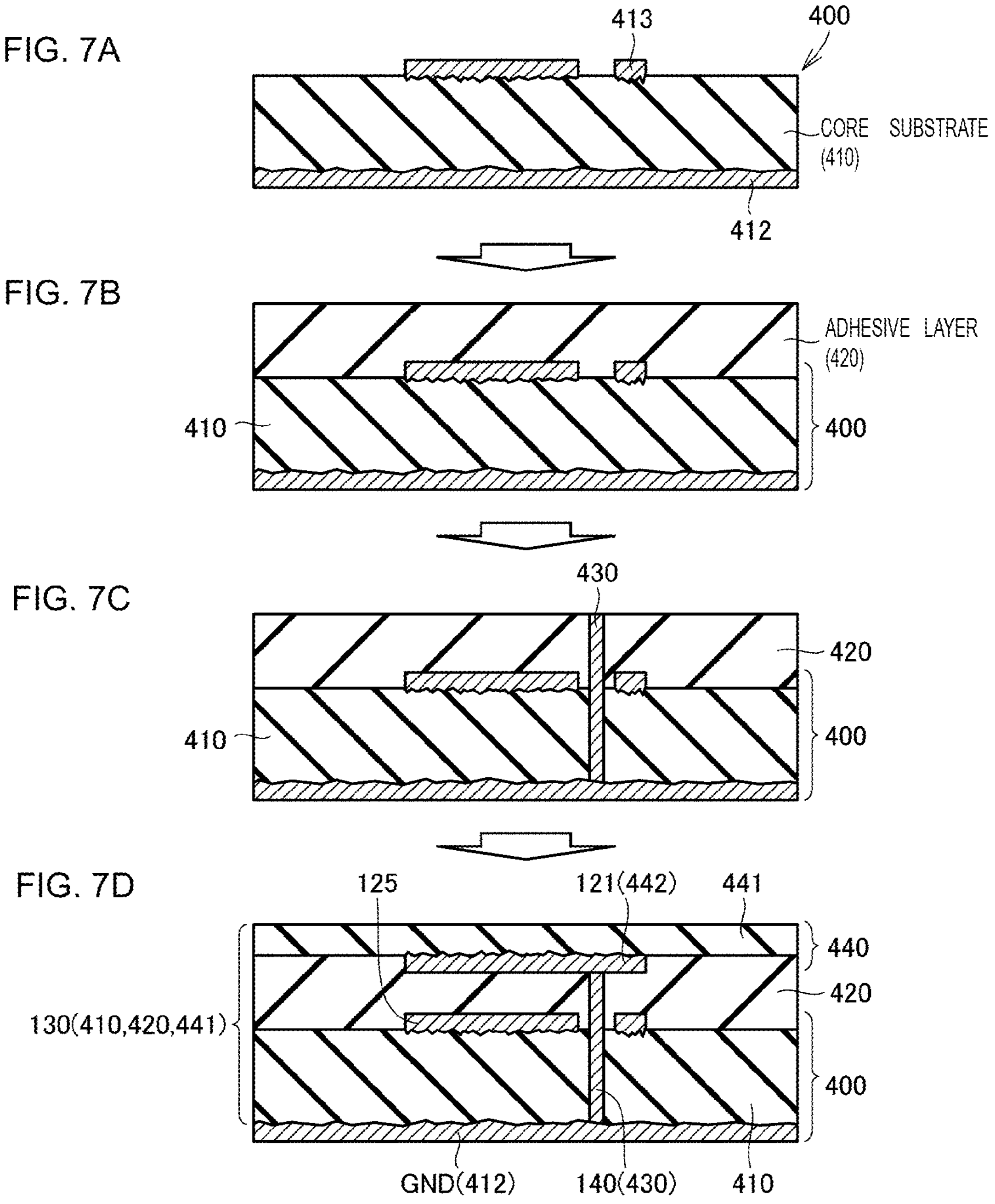
FIGS. 7A-7D illustrate a fourth example of the processing of manufacturing the antenna module.

At a first step illustrated in FIG. 7A, metal layers 412 and 413 are joined to respective surfaces of a core substrate 410 to form a first dielectric layer 400. At the step illustrated in FIG. 7A, the metal layer 412 corresponds to the ground electrode GND in FIG. 2, and the metal layer 413 corresponds to the parasitic element 125.

Subsequently, at a second step illustrated in FIG. 7B, an adhesive layer 420 that serves as the second dielectric layer is applied to the first dielectric layer 400, At a third step illustrated in FIG. 7C, a via 430 is formed in the core substrate 410 and the adhesive layer 420.

In a fourth step illustrated in FIG. 7D, a third dielectric layer 440 that is obtained by joining a metal layer 442 (corresponding to the driven element 121) to a surface of a core substrate 441 in the same manner as in the first step is joined to the adhesive layer 420. In this way, the antenna module in the third example in FIG. 3 is formed. In this case, the core substrates 410 and 441 and the adhesive layer 420 correspond to the dielectric substrate 130 in FIG. 2. Another dielectric layer may be stacked on the surface of the ground electrode GND by using an adhesive layer.

[Modifications]

According to the first embodiment, the stack antenna module that supports a dual-band is described. However, the features of the arrangement of the radiating elements according to the present disclosure can be used for antenna modules that have other structures as in a first modification to a third modification described below.

(First Modification)

In the antenna module 100 according to the first embodiment described above, the driven element 121 is disposed near the surface of the dielectric substrate 130 facing in the upward direction, and the parasitic element 125 is disposed in the layer between the driven element 121 and the ground electrode GND.

A structure described according to the first modification includes the same stack structure. In the first modification, the parasitic element is disposed away from the driven element in the upward direction, and the driven element is disposed in a layer between the parasitic element and the ground electrode.

Figure 8:
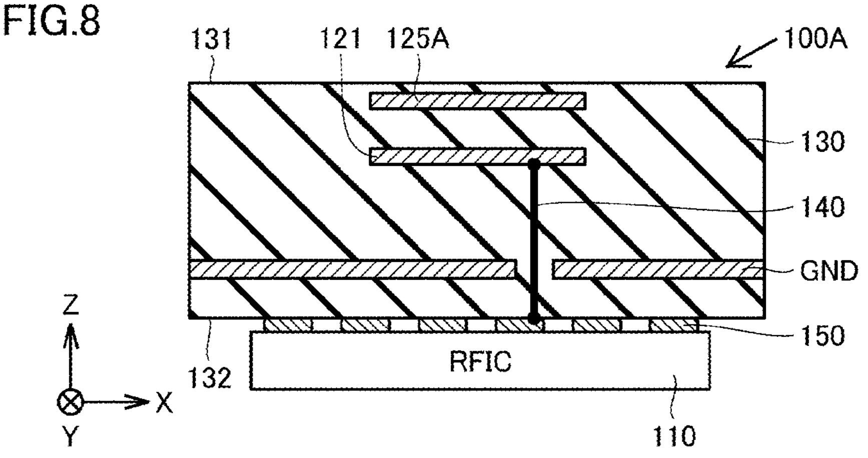
FIG. 8 is a sectional view of a first modification to the antenna module.

FIG. 8 is a sectional view of an antenna module 100A according to the first modification. Referring to FIG. 8, in the antenna module 100A, a parasitic element 125A is disposed in a layer in the dielectric substrate 130 or on the front surface 131 facing in the upward direction. The driven element 121 is disposed in a layer between the parasitic element 125A and the ground electrode GND. The power-supply wiring line 140 extends through the ground electrode GND from the RFIC 110 and is connected to the driven element 121.

As for the antenna module 100A, electrodes that have substantially the same size are used as the driven element 121 and the parasitic element 125A. With this structure, radiation can be emitted only in a single frequency band. However, the parasitic element 125A can increase a frequency band width and enables multiple frequency bands to be supported. The sizes of the electrodes of the driven element 121 and the parasitic element 125A may differ from each other.

Also, with this structure, the electromagnetic field coupling occurs between the radiating elements and the ground electrode GND and between the radiating elements, and the electric current that flows through each radiating element concentrates on the surface of the electrode. Accordingly, the radiation efficiency can be improved by the arrangement in which the smooth surface of the driven element 121 and/or the parasitic element 125A faces the ground electrode GND as in the first embodiment.

(Second Modification)

According to the first modification, the driven element 121 and the parasitic element 125A are disposed in the same dielectric substrate 130. The parasitic element, however, is not necessarily integrated in the dielectric substrate 130.

Figure 9:
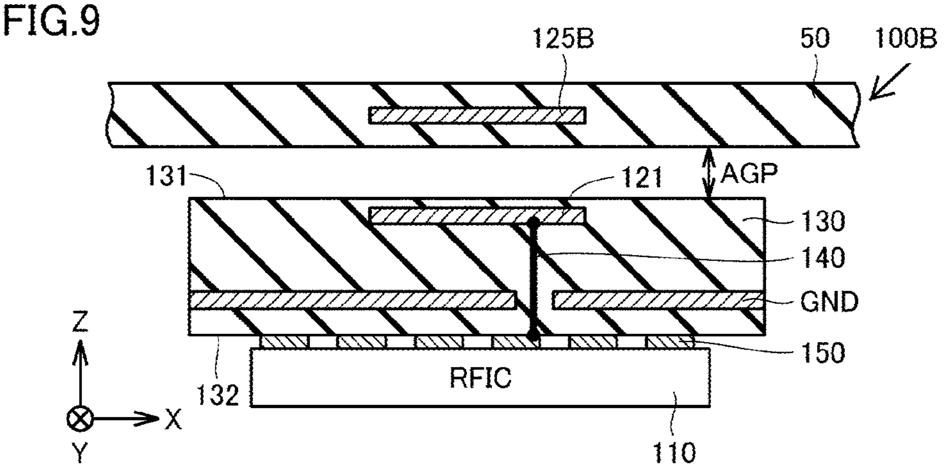
FIG. 9 is a sectional view of a second modification to the antenna module.

FIG. 9 is a sectional view of an antenna module 100B according to a second modification. Referring to FIG. 9, of the radiating elements, only the driven element 121 is disposed in the dielectric substrate 130 of the antenna module 100B. A parasitic element 125B is disposed in a housing 50 of the communication device so as to face the driven element 121. In FIG. 9, an air gap AGP is interposed between the dielectric substrate 130 and the housing 50. However, the dielectric substrate 130 and the housing 50 may be in direct contact with each other, or the dielectric substrate 130 and the housing 50 may be in contact with another dielectric, such as resin.

Also, with this structure, the radiation efficiency can be improved by the arrangement in which the smooth surface of the driven element 121 and/or the parasitic element 125B faces the ground electrode GND.

(Third Modification)

According to the first embodiment and the second modification, the stack antenna module that includes the two radiating elements of the driven element and the parasitic element is described. The features of the present disclosure can be used for an antenna module that has a single radiating element.

Figure 10:
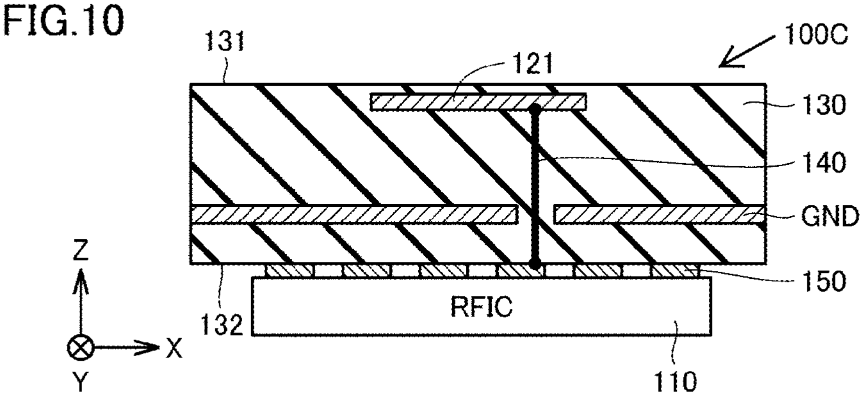
FIG. 10 is a sectional view of a third modification to the antenna module.

FIG. 10 is a sectional view of an antenna module 100C according to a third modification. The radiating element that is included in the antenna module 100C is only the driven element 121. That is, the parasitic element 125 is removed from the antenna module 100 according to the first embodiment.

Also, in this case, the radiation efficiency can be improved by the arrangement in which the smooth surface of the driven element 121 faces the ground electrode GND.

Second Embodiment

The arrangement of the smooth surfaces of the radiating elements described according to the first embodiment is used for the antenna module that radiates the radio wave in one direction. In an example described according to a second embodiment, the radiating elements according to the present disclosure are disposed in an antenna module that can radiate the radio waves in multiple directions.

Figure 11:
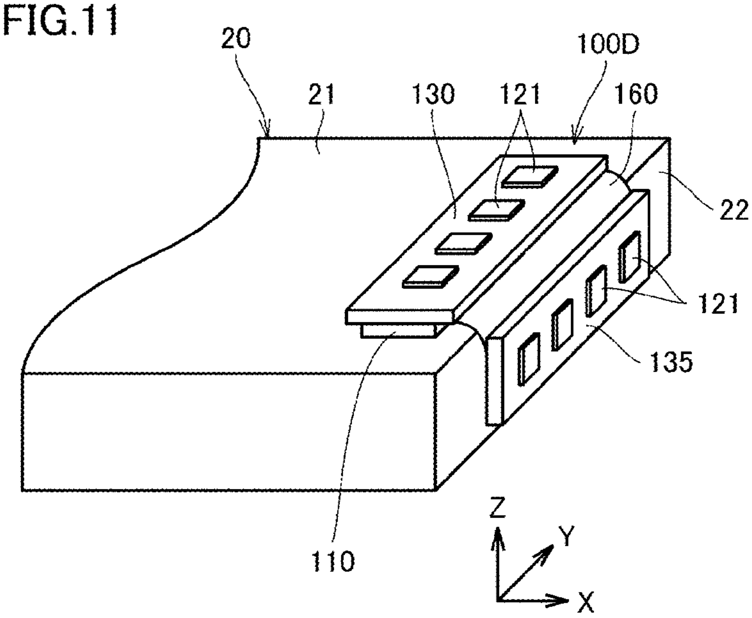
FIG. 11 is a perspective view of an antenna module according to a second embodiment.
Figure 12:
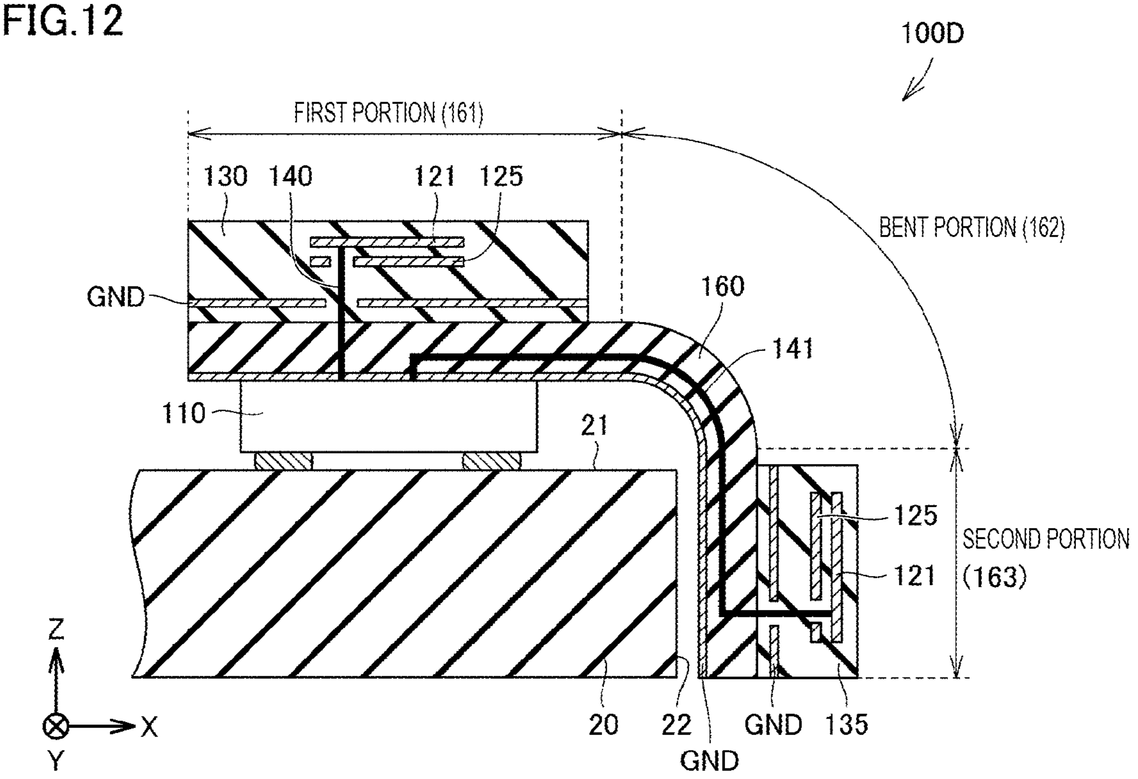
FIG. 12 is a sectional view of the antenna module in FIG. 11.

The structure of an antenna module 100D according to the second embodiment will be described with reference to FIG. 11 and FIG. 12. FIG. 11 is a perspective view of the antenna module 100D that is disposed on a mounting substrate 20. FIG. 12 is a sectional view of the antenna module 100D.

Referring to FIG. 11 and FIG. 12, the antenna module 100D is disposed on a main surface 21 of the mounting substrate 20 with the RFIC 110 thereon. The dielectric substrate 130 and a dielectric substrate 135 are disposed on a flexible substrate 160 that is interposed between the substrates and the RFIC 110. The radiating elements (the driven elements 121 and the parasitic elements 125) illustrated in FIG. 2 are disposed in each of the dielectric substrates 130 and 135.

The flexible substrate 160 includes a flat first portion 161 along the main surface 21 of the mounting substrate 20, a bent portion 162 that is bent from the first portion, and a flat second portion 163 that extends from the bent portion 162 and that faces a side surface 22 of the mounting substrate 20. The flexible substrate 160 is composed of, for example, epoxy resin or polyimide resin. The flexible substrate 160 may be composed of fluorine resin or LCP that has a decreased dielectric constant.

The dielectric substrate 130 is disposed on the first portion 161 of the flexible substrate 160, and the radiating elements (the driven elements 121 and the parasitic elements 125) are disposed such that the radio wave is radiated in the normal direction (the positive Z-axis direction) of the main surface 21. The radio frequency signal from the RFIC 110 is transmitted to each driven element 121 in the dielectric substrate 130 via the power-supply wiring line 140.

The dielectric substrate 135 is disposed on the second portion 163 of the flexible substrate 160, and the radiating elements (the driven elements 121 and the parasitic elements 125) are disposed such that the radio wave is radiated in the normal direction (the positive X-axis direction) of the side surface 22. The radio frequency signal from the RFIC 110 is transmitted to each driven element 121 in the dielectric substrate 135 via a power-supply wiring line 141 that extends in the flexible substrate 160.

Also, as for the antenna module 100D that has this structure, the smooth surface of each driven element 121, the smooth surface of each parasitic element 125, or both smooth surfaces face the ground electrode GND in an antenna portion that is disposed on the first portion 161 of the flexible substrate 160 and an antenna portion that is disposed on the second portion 163 of the flexible substrate 160 as illustrated in the first example to the third example in FIG. 3. This enables the radiation efficiency to be higher than that in the case where the rough surface of each driven element 121 and the rough surface of each parasitic element 125 face the ground electrode GND.

In an example described above, the arrangement of the smooth surfaces of the radiating elements according to the present disclosure is used for the antenna module 100D according to the above-described second embodiment that radiates the radio waves in two directions. However, the arrangement can be used for an antenna module that radiates the radio waves in three or more directions. For example, the flexible substrate 160 in FIG. 11 and FIG. 12 may be bent from the second portion 163 such that the radio wave can be radiated also toward the back surface of the mounting substrate 20 (in the negative Z-axis direction).

(Fourth Modification)

In the structure of the antenna module described above with reference to FIG. 11 and FIG. 12, the radiating elements are disposed in the dielectric substrates that have the different normal directions by using the flexible substrate such that the radio waves are radiated in multiple directions.

In a structure described according to a fourth modification, the radiating elements are disposed near two surfaces (the front surface and the back surface) of the dielectric substrate that faces away from each other such that the radio waves are radiated in two directions.

Figure 13:
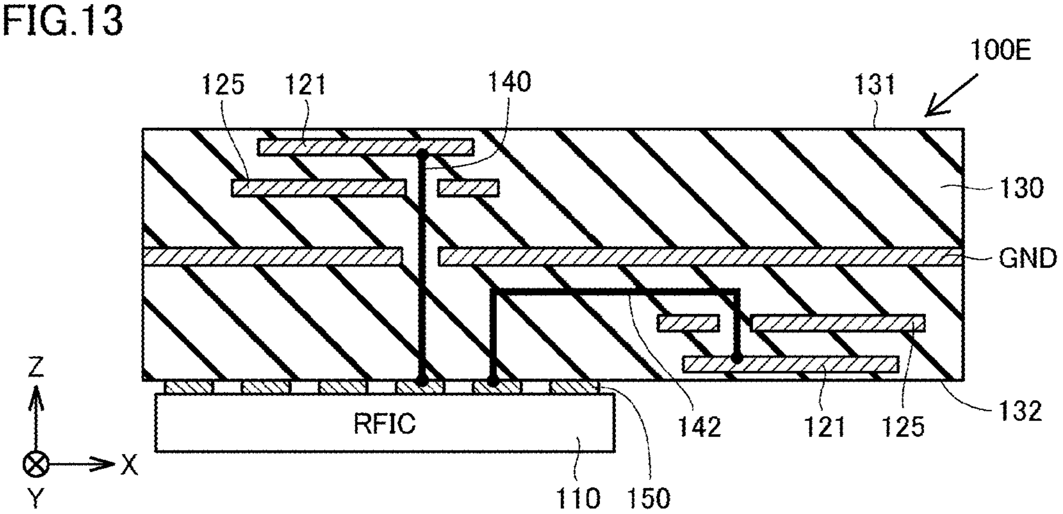
FIG. 13 is a sectional view of a fourth modification to the antenna module.

FIG. 13 is a sectional view of an antenna module 100E according to the fourth modification. Referring to FIG. 13, in the antenna module 100E, the ground electrode GND is disposed near the center of the dielectric substrate 130 in the thickness direction (the Z-axis direction), and the radiating elements (the driven elements 121 and the parasitic elements 125) are disposed near the front surface 131 and the back surface 132 of the dielectric substrate 130. The radio frequency signal from the RFIC 110 is transmitted to the driven element 121 near the front surface 131 via the power-supply wiring line 141. The radio frequency signal from the RFIC 110 is transmitted to the driven element 121 near the back surface 132 via a power-supply wiring line 142.

The driven elements 121, the parasitic elements 125, or both are disposed such that the smooth surface of each electrode faces the ground electrode GND. Consequently, a loss due to the electric current that flows through each radiating element is reduced, and the radiation efficiency of the antenna module can be improved.

Also, according to the fourth modification, an element an end surface of which is connected to the ground electrode may be used as each radiating element.

In the structures according to the embodiments and the modifications described above, the radiating elements and the ground electrode are disposed in the same dielectric substrate except for the parasitic element (the parasitic element 125B in FIG. 9) according to the second modification. However, the radiating elements and the ground electrode are not necessarily disposed in the same dielectric substrate. For example, another dielectric substrate in which the radiating elements are disposed may be connected to a dielectric substrate in which the ground electrode is disposed by using adhesive or solder. The two dielectric substrates may interpose an air gap therebetween as in the second modification. The dielectric constant of the dielectric substrate in which the radiating elements are disposed may be equal to or differ from the dielectric constant of the dielectric substrate in which the ground electrode is disposed. There may be no dielectric around the radiating elements, and the radiating elements themselves may be in a space.

It should be considered that the embodiments disclosed herein are examples in all aspects and are not restrictive. The scope of the present disclosure is not shown by the embodiments described above but by claims and includes all modifications having equivalent meaning and scope to those of the claims.

REFERENCE SIGNS LIST

10 communication device, 20 mounting substrate, 21 main surface, 22 side surface, 50 housing, 100, 100A to 100E antenna module, 105 BBIC, 110 RFIC, 111A to 111D, 113A to 113D, 117 switch, 112AR to 112DR low-noise amplifier, 112AT to 112DT power amplifier, 114A to 114D attenuator, 115A to 115D phase shifter, 116 signal combiner/demultiplexer, 118 mixer, 119 amplifier circuit, 120 antenna device, 121 driven element, 125, 125A, 125B parasitic element, 130, 135 dielectric substrate, 131 front surface, 132 back surface, 140 to 142 power-supply wiring line, 150 solder bump, 160 flexible substrate, 161 first portion, 162 bent portion, 163 second portion, 200, 200A to 200D dielectric sheet, 210, 300, 400, 440 dielectric layer, 220, 312, 313, 340, 412, 413, 442 metal layer, 230 conductive paste, 310, 410, 441 core substrate, 320, 420 adhesive layer, 330, 430 via, AGP air gap, GND ground electrode, SP1 feed point.

The invention claimed is:

1. An antenna module comprising:

a dielectric substrate;

a ground electrode in the dielectric substrate;

a first radiating element that has a flat plate shape; and a second radiating element that faces the first radiating element, wherein the first radiating element has a first surface and a second surface that has a higher degree of a surface roughness than a surface roughness of the first surface, wherein the first surface of the first radiating element faces the ground electrode, wherein the second radiating element is in a layer between the first radiating element and the ground electrode, wherein the second radiating element has a third surface and a fourth surface that has a higher degree of a surface roughness than a surface roughness of the third surface, and wherein the fourth surface of the second radiating element faces the ground electrode.

2. The antenna module according to claim 1, wherein the first radiating element is a driven element, and the second radiating element is a parasitic element.

3. The antenna module according to claim 2, further comprising a power supply circuit that transmits a radio frequency signal to the driven element.

4. The antenna module according to claim 1, wherein the first radiating element is a parasitic element, and the second radiating element is a driven element.

5. The antenna module according to claim 1, wherein the ground electrode has a fifth surface and a sixth surface that has a higher degree of a surface roughness than a surface roughness of the fifth surface, and wherein the sixth surface of the ground electrode faces the first radiating element.

6. The antenna module according to claim 1, wherein the antenna module comprises radiating elements that include the first radiating element, wherein the radiating elements face each other, and wherein the radiating elements are in the dielectric substrate.

7. The antenna module according to claim 1, wherein the antenna module comprises radiating elements that include the first radiating element, wherein the radiating elements face each other, and wherein at least one of the radiating elements is in a housing of a communication device.

8. The antenna module according to claim 1, further comprising:

a third radiating element;

another dielectric substrate comprising the third radiating element; and a connection substrate that connects the dielectric substrate to the other dielectric substrate, wherein the connection substrate includes:

a flat first portion, a bent portion that is bent from the flat first portion, and a flat second portion that extends from the bent portion, and wherein the dielectric substrate is in the flat first portion, and the other dielectric substrate is in the flat second portion.

9. A communication device comprising the antenna module according to claim 1.

10. A method of manufacturing an antenna module that includes a first layer that contains a first radiating element, a second layer, and a third layer that contains a ground electrode and a second radiating element, each of the first radiating element, the ground electrode, and the second radiating element having a smooth surface and a rough surface, respectively, the smooth surface of the first radiating element having a lower degree of a surface roughness than a surface roughness of the rough surface of the first radiating element, the smooth surface of the ground electrode having a lower degree of a surface roughness than a surface roughness of the rough surface of the ground electrode, and the smooth surface of the second radiating element having a lower degree of a surface roughness than a surface roughness of the rough surface of the second radiating element, the method comprising:

a step of joining the rough surface of the first radiating element to a first dielectric layer to form the first layer;

a step of providing a second dielectric layer to form the second layer;

a step of joining the rough surface of the ground electrode to a first side of a third dielectric layer and joining the rough surface of the second radiating element to a second side of the third dielectric layer to form the third layer, wherein the first and second sides of the third dielectric layer face opposite respective directions;

a step of stacking the second layer on the second side of the third dielectric layer; and a step of stacking the first layer on the second layer such that the smooth surface of the first radiating element and the smooth surface of the ground electrode face in a same direction, and the smooth surface of the first radiating element faces the ground electrode.

* * * * *